(12) United States Patent
LeFlohic et al.

(10) Patent No.: US 10,672,038 B1
(45) Date of Patent: Jun. 2, 2020

(54) AUDIENCE DATA IN AUDIO ADVERTISING

(71) Applicant: Jelli, Inc., San Mateo, CA (US)

(72) Inventors: John Paul LeFlohic, San Mateo, CA (US); Sreeharsha Kamireddy, Danville, CA (US); Torsten Schulz, Palo Alto, CA (US); Em Huynh, San Jose, CA (US); Tajinder Singh, Fremont, CA (US)

(73) Assignee: Jelli, Inc., San Mateo, CA (US)

( * ) Notice: Subject to any disclaimer, the term of this patent is extended or adjusted under 35 U.S.C. 154(b) by 192 days.

(21) Appl. No.: 15/474,966

(22) Filed: Mar. 30, 2017

Related U.S. Application Data

(60) Provisional application No. 62/317,378, filed on Apr. 1, 2016.

(51) Int. Cl.
*G06Q 30/02* (2012.01)

(52) U.S. Cl.
CPC ..... *G06Q 30/0276* (2013.01); *G06Q 30/0269* (2013.01)

(58) Field of Classification Search
USPC .................................. 705/6, 14.66
See application file for complete search history.

(56) References Cited

U.S. PATENT DOCUMENTS

2009/0006145 A1* 1/2009 Duggal ............... G06Q 10/025
    705/6
2012/0166289 A1* 6/2012 Gadoury ............ G06Q 30/0269
    705/14.66

* cited by examiner

*Primary Examiner* — Afaf Osman Bilal Ahmed
(74) *Attorney, Agent, or Firm* — Van Pelt, Yi & James LLP

(57) ABSTRACT

Audience data received from a plurality of audience data sources is stored. An advertising goal defined at least in part by reference to one or more audience attributes is received. Audience data from two or more of said audience data sources is used to determine an advertising plan to meet the advertising goal.

20 Claims, 6 Drawing Sheets

3rd Pty Analysis by Station (1 Level of Granularity)

| Station / Cohort | Daypart | Demo | DMA |
|---|---|---|---|
| WOR-AM Republican 52,000 | M-F 6a-10a 52,000<br>M-F 10a-3p 52,000<br>M-F 3p-7p 52,000<br>M-F 7p-12a 52,000<br>S+S 6a-10a 52,000<br>S+S 10a-3p 52,000<br>S+S 3p-7p 52,000<br>S+S 7p-12a 52,000 | Adults 18+ 52,000<br>Adults 18-34 52,000<br>Adults 25-54 52,000<br>Female 18+ 52,000<br>Female 18-34 52,000<br>Female 25-54 52,000<br>Male 18+ 52,000<br>Male 18-34 52,000<br>Male 25-54 52,000 | Primary 52,000<br>Secondary 52,000<br>Tertiary 52,000<br><br>─ 502 |

3rd Pty Analysis by Station, Daypart (2 Levels of Granularity)

| Station / Cohort | Daypart | Demo | DMA |
|---|---|---|---|
| WOR-AM Republican 52,000 | M-F 6a-10a 95,000<br>M-F 10a-3p 74,000<br>M-F 3p-7p 85,000<br>M-F 7p-12a 40,000<br>S+S 6a-10a 50,000<br>S+S 10a-3p 45,000<br>S+S 3p-7p 35,000<br>S+S 7p-12a 22,000 | Adults 18+ 95,000<br>Adults 18-34 95,000<br>Adults 25-54 95,000<br>Female 18+ 95,000<br>Female 18-34 95,000<br>Female 25-54 95,000<br>Male 18+ 95,000<br>Male 18-34 95,000<br>Male 25-54 95,000 | Primary 95,000<br>Secondary 95,000<br>Tertiary 95,000<br><br>─ 504 |

3rd Pty Analysis by Station, Daypart, Demo, DMA (4 Levels of Granularity)

| Station / Cohort | Daypart | Demo | DMA |
|---|---|---|---|
| WOR-AM Conservative 52,000 | M-F 6a-10a 95,000<br>M-F 10a-3p 74,000<br>M-F 3p-7p 85,000<br>M-F 7p-12a 40,000<br>S+S 6a-10a 50,000<br>S+S 10a-3p 45,000<br>S+S 3p-7p 35,000<br>S+S 7p-12a 22,000 | Adults 18+ 95,000<br>Adults 18-34 70,000<br>Adults 25-54 100,000<br>Female 18+ 90,000<br>Female 18-34 45,000<br>Female 25-54 80,000<br>Male 18+ 110,000<br>Male 18-34 75,000<br>Male 25-54 105,000 | Primary 90,000<br>Secondary 100,000<br>Tertiary 105,000<br><br>─ 506 |

FIG. 5

# AUDIENCE DATA IN AUDIO ADVERTISING

CROSS REFERENCE TO OTHER APPLICATIONS

This application claims priority to U.S. Provisional Patent Application No. 62/317,378 entitled AUDIENCE DATA IN LINEAR BROADCAST ADVERTISING filed Apr. 1, 2016 which is incorporated herein by reference for all purposes.

BACKGROUND OF THE INVENTION

Advertising allows an organization to proclaim their mission, their goods and/or their services, and/or to develop brand recognition. The audio channel is a popular channel to advertise on, as many consumers derive entertainment and news from audio, including linear broadcast and online streaming. Audio advertising allows an advertiser to integrate their advertisement spot ("ad spot") within an audio program. Buyers of audio advertising want to have an ability to best target an ad spot to the publisher who might best reach their intended potential market.

BRIEF DESCRIPTION OF THE DRAWINGS

Various embodiments of the invention are disclosed in the following detailed description and the accompanying drawings.

FIG. 5 is an illustration of an embodiment of third party source audience data granularity.

DETAILED DESCRIPTION

Figure 1:
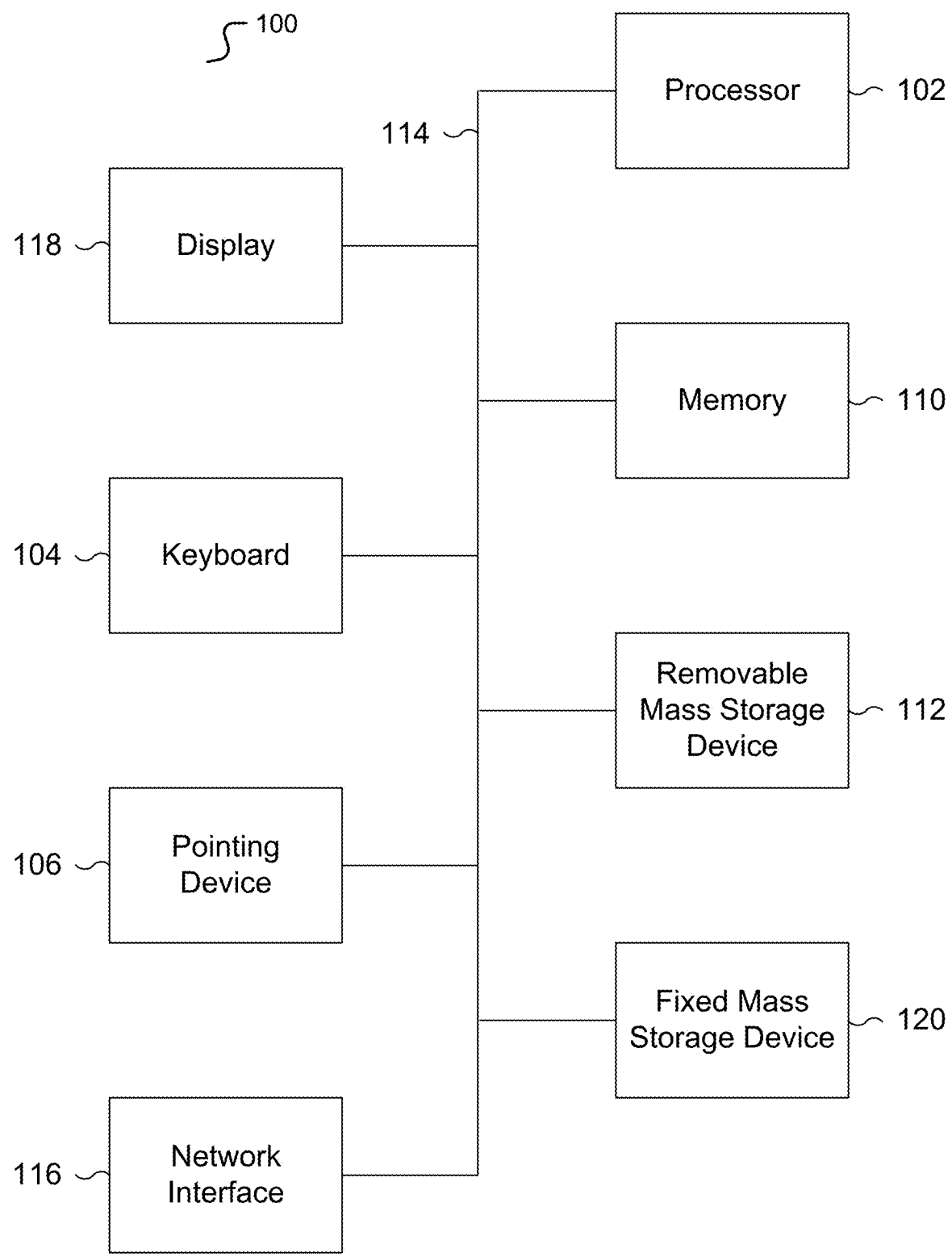
FIG. 1 is a functional diagram illustrating a programmed computer/server system for processing audience data in audio advertising in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Without computerized processing in audio advertising, it is traditionally only practical to apply a single generic and broad dataset about the listeners. However, listener targeting may be greatly enhanced by factoring in multiple detailed datasets about the listeners, for example with audience data. In one embodiment, a continuously updated pipeline is created from the providers of the audience data to the central targeting facility. In one embodiment, this is exposed to users such as audio advertising buyers in a comprehensible way for their exploration. In one embodiment, core equations and logic of the targeting algorithms are created and/or updated to make use of audience data. In one embodiment, intuitive and sound targeting metrics are designed, calculated, and presented to users.

A traditional source for targeting data is the summary data set (SDS), released by Nielsen biannually, quarterly, and for some data, monthly. The SDS gives listener counts for each station and each part of the week in an average week, as measured over several months. However, SDS measures are only available after the full sampling period. Additionally, lacking a fully computerized process, targeting is traditionally done only making use of the SDS's simpler non-qualitative demographic data, sometimes termed a "broad demographic". Broad-demographic data breaks down listeners only by gender, for example "men" or "women", and age range, for example "45-49". Throughout this specification, a source other than a broad demographic traditional source for audience data such as a Nielsen SDS is termed a "third-party source" for audience data.

Leveraging third-party sources in audio advertising is disclosed. Leveraging these sources may be applied to linear radio broadcast and/or online streaming. With the traditional SDS source, industry practice may be to hand-import an emailed or CD-delivered dataset coming from Nielsen quarterly or biannually. By contrast, third-party sources are often updated real-time and are available online, requiring an online continuous pipeline to the data provider to be designed, programmed, and hardware allocated. Third-party sources typically have specific qualitative data, for example one category might be "luxury-car owners". These qualities may even be organized into a hierarchy; for example, "car owners" might have "luxury-car owners" as a subgroup, which in turn might have a subgroup of "Lexus owners". For the example given above, integration includes allowing a buyer to target broad demographics like "women 45-49" who also are "luxury-car owners", or "men 35-39" who are "Lexus owners" as a double goal. Dual targeting broad demographics along with specific qualitative data allows a finer refinement over the traditional broad demographic targeting.

Reconciling third-party sources with a traditional broad demographic source into a simple unified interface is disclosed. Reconciling may allow a user to specify their targeting goals. Visualization and other algorithms combine/integrate third party sources with traditional sources to provide a filtered view with all data sets active, which is important to reduce inefficiencies for an advertiser with a goal. Traditionally only the traditional source and only target ad placement based on the broad demographic data is used. Traditionally if qualitative data is used, it may only be part of a post-analysis to see how well various groups were reached.

FIG. 1 is a functional diagram illustrating a programmed computer/server system for processing audience data in audio advertising in accordance with some embodiments. As shown, FIG. 1 provides a functional diagram of a general purpose computer system programmed to provide audience data processing in accordance with some embodiments. As will be apparent, other computer system architectures and configurations may be used for audience data processing.

Computer system (100), which includes various subsystems as described below, includes at least one microprocessor subsystem, also referred to as a processor or a central processing unit ("CPU") (102). For example, processor (102) may be implemented by a single-chip processor or by multiple cores and/or processors or by virtual processors. In some embodiments, processor (102) is a general purpose digital processor that controls the operation of the computer system (100). Using instructions retrieved from memory (110), the processor (102) controls the reception and manipulation of input data, and the output of data on output devices, for example network interface (116) or storage (120).

Processor (102) is coupled bi-directionally with memory (110), which may include a first primary storage, typically a random-access memory ("RAM"), and a second primary storage area, typically a read-only memory ("ROM"). As is well known in the art, primary storage may be used as a general storage area and as scratch-pad memory, and may also be used to store input data and processed data. Primary storage may also store programming instructions and data, in the form of data objects and text objects, in addition to other data and instructions for processes operating on processor (102). Also as well known in the art, primary storage typically includes basic operating instructions, program code, data and objects used by the processor (102) to perform its functions, for example programmed instructions. For example, primary storage devices (110) may include any suitable computer-readable storage media, described below, depending on whether, for example, data access needs to be bi-directional or uni-directional. For example, processor (102) may also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system (100), and is coupled either bi-directionally (read/write) or uni-directionally (read only) to processor (102). For example, storage (112) may also include computer-readable media such as flash memory, portable mass storage devices, holographic storage devices, magnetic devices, magneto-optical devices, optical devices, and other storage devices. A fixed mass storage (120) may also, for example, provide additional data storage capacity. The most common example of mass storage (120) is an eMMC device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) may be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a network interface (116), a keyboard and/or pointing device (104), as well as an auxiliary input/output device (106) interface, a sound card, microphone speakers, and other subsystems as needed. For example, the pointing device (104) can be a mouse, stylus, track ball, touch display, and/or tablet, and is useful for interacting with a graphical user interface.

The communication interface (116) allows processor (102) to be coupled to another computer, computer network, or telecommunications network using a network connection as shown. For example, through the communication interface (116), the processor (102) may receive information, for example data objects or program instructions, from another network, or output information to another network in the course of performing method/process steps. Information, often represented as a sequence of instructions to be executed on a processor, may be received from and outputted to another network. An interface card or similar device and appropriate software implemented by, for example executed/performed on, processor (102) may be used to connect the computer system (100) to an external network and transfer data according to standard protocols. For example, various process embodiments disclosed herein may be executed on processor (102), or may be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, may also be connected to processor (102) through communication interface (116).

In addition, various embodiments disclosed herein further relate to computer storage products with a computer readable medium that includes program code for performing various computer-implemented operations. The computer-readable medium is any data storage device that may store data which may thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that may be executed using an interpreter.

The computer/server system shown in FIG. 1 is but an example of a computer system suitable for use with the various embodiments disclosed herein. Other computer systems suitable for such use may include additional or fewer subsystems. In addition, bus (114) is illustrative of any interconnection scheme serving to link the subsystems. Other computer architectures having different configurations of subsystems may also be utilized, including virtual servers.

Figure 2:
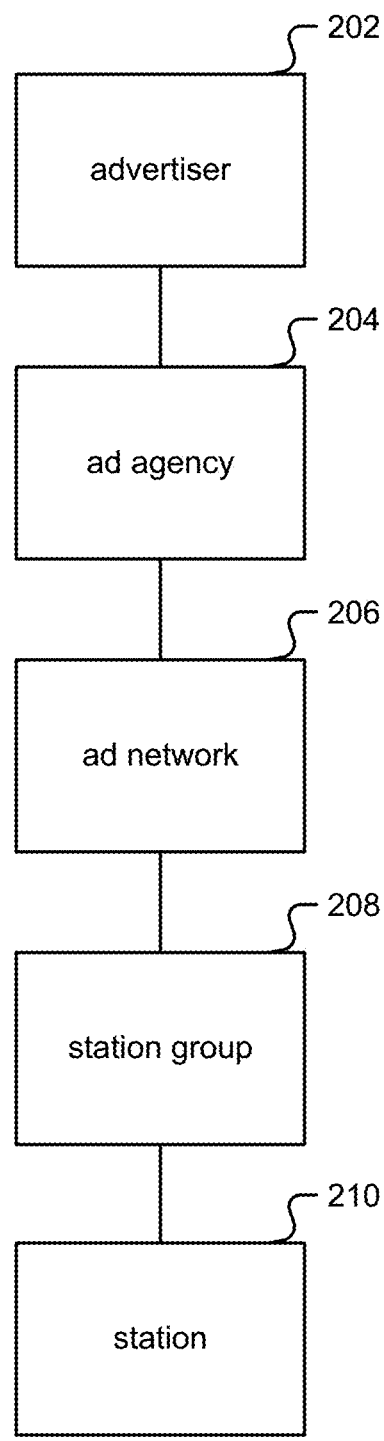
FIG. 2 is a hierarchical diagram illustrating example parties involved in the creation and placement of an ad for broadcast.

Advertising and Broadcast. FIG. 2 is a hierarchical diagram illustrating example parties involved in the creation and placement of an ad for broadcast. A national Advertiser (202) has one or more products, services, and/or messages as advertising on broadcast media. Advertiser (202) retains an ad agency (204) to develop the ad campaign. For the purposes of this specification the ad campaign may be a national campaign or a regional campaign. An ad campaign may include one or more Request For Proposal ("RFP") specifications. An RFP specification may include targeting information, including demographics, markets, market characteristics, weeks, and periods of each week. An RFP specification may also include sizing specifications, including a flexible combination of budget limit, impressions goal, or impressions per price rate limiters. Impressions and/or impacts are a measure of the audience of a station when an ad is broadcast, and are statistically determined by companies such as Arbitron/Nielsen via diary or automated listeners, for example by the hour. An RFP may request impressions in terms of Gross Ratings Points ("GRP"'s) in a specific demographic wherein 1 GRP is 1% of the national population within the specific demographic. For example if an ad campaign requests 2 GRPs for women aged 18-45, and it is determined that 65 million women are aged 18-45 nationally, then the ad campaign requests 2% of 65 million or 1.3 million impressions within that demographic.

The ad campaign also comprises one or more ad-creative assets, for example audio creative suitable for a radio ad, video creative suitable for television, and online creative suitable for internet distribution. In some embodiments, advertiser (202) comprises an internal ad agency team (204) within the same corporation.

Ad agency (204) then retains an ad network (206) for publication and/or distribution of the ad campaign. An ad network (206) manages a portion of the placement spots available on multiple broadcast stations (210). Each broadcast station (210) may be independent of the ad network (206) or may be part of the ad network (206). The ad network (206)'s inventory is the collection of placement spots available on the broadcast media of each broadcast station (210). As will be further elaborated, each spot comprises a position, for example a day of week and/or a daypart (for example, 'AM Drivetime', 'lunch', 'PM Drivetime', or 'evening'). Ad network (206)'s inventory may be acquired based on direct affiliation with specific broadcast stations (210) and/or may be acquired based on affiliation with station groups (208) comprising multiple broadcast stations (210).

The Ad Network.

Radio stations typically have relatively fixed ad breaks, typically twice per hour. A full break might be 5 minutes long, with 4 minutes of advertising. Stations (210) attempt to fill most of each ad break with local advertisers as these tend to pay substantially more to the station (210) than national-product advertising by advertisers (202). However, stations (210) usually do not have enough demand to fully fill the ad-placement spots they have. These ad spots are thus called a station's inventory. The station (210) will thus contract out a portion of their inventory to an ad network (206). The ad network (206) mediates between a large group of stations (208), (210) and national advertisers (202). An ad network (206) may be necessary because the logistical overhead of advertisers (202) interacting directly with stations (210) would be prohibitive for both stations (210) and advertisers (202).

Station Inventory.

Figure 3:
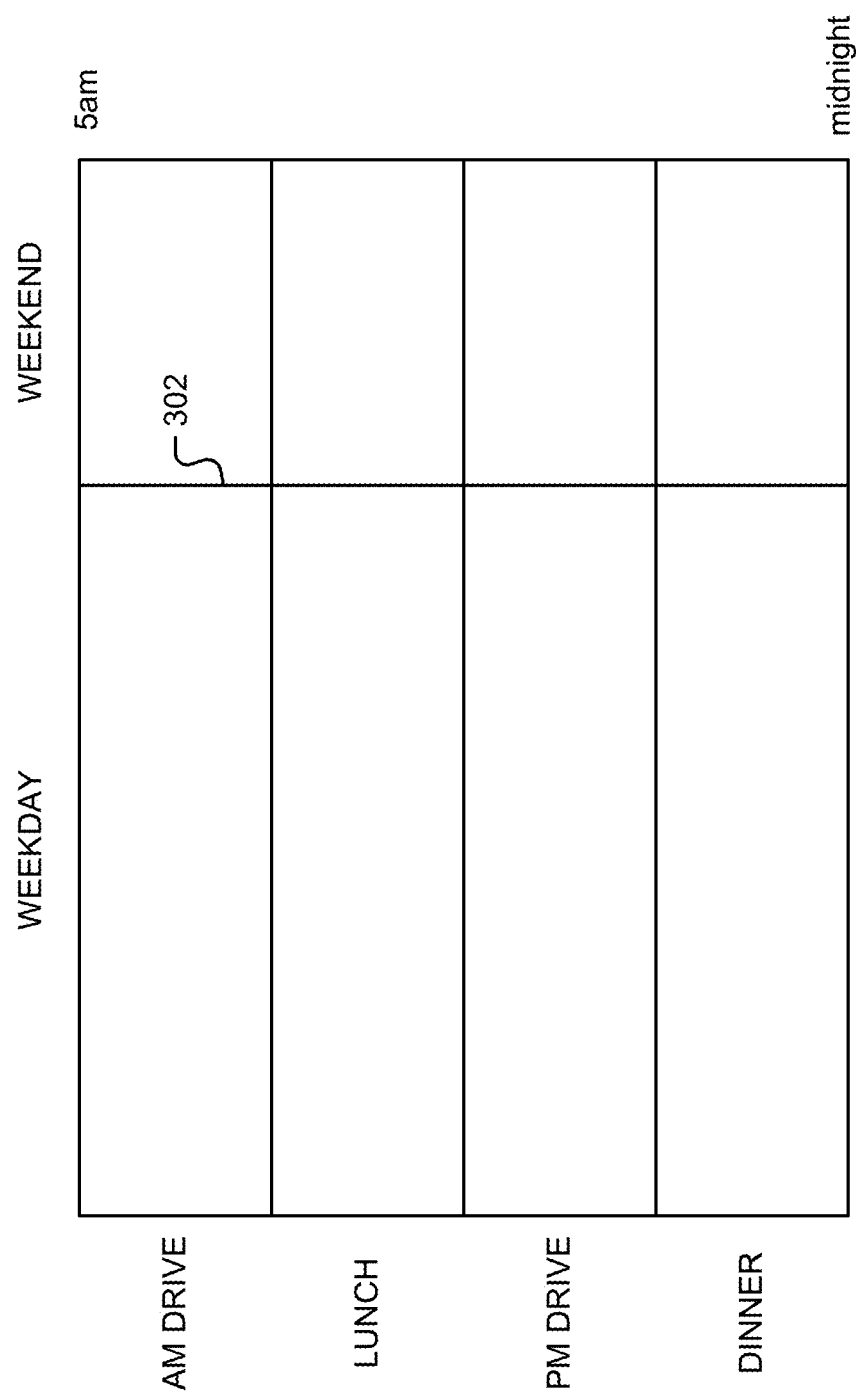
FIG. 3 is an illustration depicting radio broadcast dayparts.

FIG. 3 is an illustration depicting radio broadcast dayparts. In a radio embodiment, the station (210) typically provides the ad network (206) with inventory for each week, for example twenty-eight pieces of inventory. Each of the seven days of the week has an inventory for four typical dayparts: AM Drive (referring to the morning drive time to work for commuters), Midday, PM Drive (also known as afternoon drive time), and Evening. An inventory is specified by giving the part of the week it covers called a "daypart" (302), the number of ad breaks it contains and the seconds duration each break is to last.

For example, an inventory might cover the "Monday 5 a-10 a" daypart (referring to 5 am to 10 am on Monday), and contain two 60-second breaks. This would indicate that the station agrees to play one minute of the network's ad content (an "ad break" from the network's perspective) at two points during the daypart Monday 5 a-10 a. However, the station (210) does not explicitly state when they will play the breaks, only that they will not play them too close together, for example within 25 minutes of each other. The coarseness of the contract allows the station (210) to retain some flexibility with where it places its network ads, while still allowing the network (206) to place advertisers' ads into the part of the day they desire.

Figure 4:
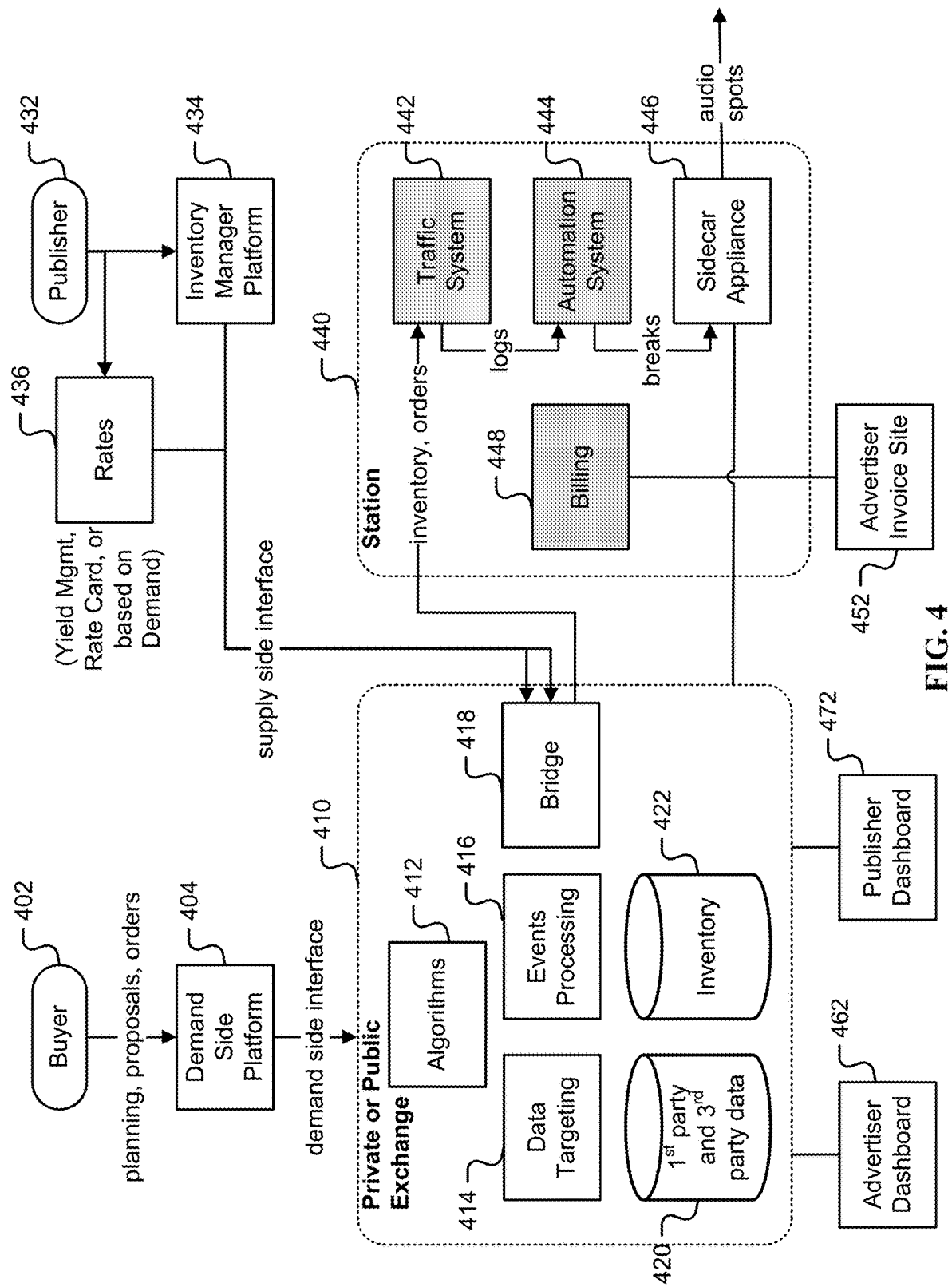
FIG. 4 is a block diagram of an advertising system.

FIG. 4 is a block diagram of an advertising system. In FIG. 4, Buyer (402) represents an advertiser (202), ad agency (204), and/or an ad network (206)/station group (208) assisting an advertiser in purchasing adspace. The Buyer (402) submits campaign planning, proposals and/or orders with a demand side platform (404). Throughout this specification a platform references any programmatic user interface without limitation including a web site, web portal, mobile portal, mobile app, call center and/or computer program. In one embodiment the demand side platform may be represented as two different platforms: a first "self service" platform for an advertiser (202) and/or ad agency (204) to directly interface with, a second for a publisher (206)/(208) to interface buyers through. In both cases, the demand side platform (404) interfaces with ad exchange (410) using a demand side interface, comprising programmatic interfaces such as an application programming interface (API), web service, computer protocol, and other automated and semi-automated interface standards.

Ad exchange (410) comprises algorithms (412), for example algorithms for dynamic lineup and/or placement. Algorithms (412) also may use advance techniques such as data targeting (414) to use first party data such as Nielsen data and/or third party data such as that provided by a publisher (420) to enhance targeting with more precise demographics, and so on. Algorithms (412) also may use events processing (416) to enhance delivery by allowing events such as weather events, political events, sports events, and so on to affect delivery and creative selection. The ad exchange (410) may be one or more of: a public ad exchange and a private exchange.

A private exchange (410) is associated with an inventory pool (422) that may be affiliated with a single owned and operated group of stations (210) and sold by the sales channel of that owned and operated group of stations. The ability to purchase on a private exchange usually requires an invitation to the agency (204) or advertiser (202). A public exchange (410) is associated with an inventory pool (422) that is comprised of inventory by a group of stations (210) owned by multiple owners. A public exchange may also require an invitation to agencies (204) and advertisers (202), but in some embodiments may also be completely public and allow any buyer to use a self service demand side platform (404) to purchase inventory from the public exchange (410).

Publisher (432) interfaces with ad exchange (410) using an inventory manager platform (434) to feed inventory (422) in the ad exchange (410). Publisher (432) also provides input in the form of rates (436), whether the rates are based on yield management, a rate card, or an instruction or algorithm to base rates on demand. In one embodiment, the ad exchange (410) takes an instruction/algorithm to base rates on demand and manifests it using algorithms (412) to provide a dynamic and/or responsive rate. The publisher (432) using the inventory manager platform and inputs rates to a bridge (418) on the ad exchange (410) using a supply side interface, comprising programmatic interfaces such as an API, web service, computer protocol, and other automated and semi-automated interface standards.

A station (440) affiliated with publisher (432) comprises preexisting systems, shown in FIG. 4 as grey blocks: traffic system (442) which produces logs for automation system (444), and billing (448) which invoices to an advertiser invoice site (452) for campaigns associated with ad exchange (410). The traffic system (442) interfaces with bridge (418) for generic inventory and orders: in one embodiment, the traffic system is given the number of breaks, the length of breaks (e.g. 30s or 60s), and an identifier to associate the order with a programmatic ad network (206) that is associated with ad exchange (410).

Automation system (444) then signals breaks to sidecar appliance (446), which is coupled with the ad exchange and submits audio spots directly for listening. Exchange (410) using the information from sidecar appliance (446) is coupled with an advertiser dashboard (462) for reporting, accounting, and QA to advertiser/buyer (402), and likewise coupled with a publisher dashboard (472) for reporting, accounting, and QA to publisher (432).

In the example shown in FIG. 4, the publisher (432) is associated with a linear broadcast station (440). Without limitation, a publisher (432) may be associated instead with an online streaming service, such as iTunes or Spotify. In this case, the online streaming service does not have a sidecar appliance (446) but instead a "sidecar API" to allow exchange (410) to interject the ad spot at the appropriate time.

Integrated User Experience.

Integrating one or more third party sources of audience data with traditional sources of audience data is disclosed. Part of integration may include simplifying the user (202/204) experience when dealing with various first-party and third-party data sources. This may include abstracting third-party data to the same time periods and geographic regions as a user (202/204) is used to seeing in Nielsen data. Examples follow for how this is done for a time period and for a geographic region.

Time Period Example.

In one embodiment, in a case where the daypart and/or part of the week the user (202/204) specifies does not match a base data cell in the third-party data they are using, the third-party data's value at that user-daypart level must be calculated and/or derived. The derivation method may be kept simple, to maintain efficiency and to simplify the user experience. To keep derivations simple, the third-party data is required to use the same base dayparts that a traditional source such as a Nielsen SDS uses. An additional requirement may be that the dayparts the user (202/204) is allowed to specify may be whole combinations of base dayparts for other reasons. By keeping the situation simple, the AQH may be derived mathematically for a user daypart that covers multiple base dayparts using equation:

$$daypartAQH = \text{sum of each} \\ (baseDaypartAQH * chanceOfLandingInBaseDaypart), \\ \text{where } chanceOfLandingInBaseDaypart = \\ hoursInBaseDaypart/hoursInUserDaypart.$$

That is, the AQH of each daypart is weighted by its number of hours versus the hours in the user daypart; the weighted values are then summed up, as AQH is a measure of how many persons will be listening at a randomly chosen point in time within a time period. The chance that the random point in time will land in a particular base daypart is precisely the number of hours of the base daypart versus the hours in the user daypart. These algorithmic relationships assisten determining the right set of constraints to enforce that give as much usage flexibility as possible without additional complexity.

Geographic Area Example.

In one embodiment, deriving third-party data values that match up with Nielsen's geographic regions may be done algorithmically since the values derived are typically summable, for example population—either total population, or population in a particular demographic. One key ingredient is to maintain a dynamically updated table of which geographic regions, for example MSAs, fit into which other regions, for example DMAs or states/provinces. The population of a composite region is may be derived as the sum of the components' regions. Depending on a specific third-party source, some metrics may include spillover values from one region to another, and these spillover amounts may be excluded to avoid double-counting when summing regions together.

Campaign Planning.

An ad spot buyer (202,204) goes through a planning stage for their advertising plan. This may include "what if" scenarios to theoretically test different campaign tactics to reach the overall result wanted.

In one embodiment, planning includes the steps of:
Choosing a marketplace, for example at least one of the following: audience, spot, wired network, unwired network, online marketplace, linear broadcast inventory;
Basic audience demographic targets such as age range and gender;
Target format including channels and/or stations;
Market goals in terms of campaign dates, markets, GRPs and/or CPPs, budget, and/or impressions;
Selecting spot load, reach, frequency, and/or day parts; and/or
Labeling/determining the advertiser, campaign, flight dates, and/or length of audio of creative.

The planning stage also includes targeting an audience, including selecting which audience data to use. This may include choosing survey and/or currency data, for example Nielsen SDS data and/or enhanced third-party audience data, which may be based on markets measured on the DMA and/or MSA level. This includes at least one of the following:
Integrating custom audience data into the planning system;

Enhancing the planning system to give planners (202,204) the option to use the data as a factor for the inventory selection algorithm;

Using custom audience data to optimize a new or existing plan in which Nielsen demo is the primary selection criteria; and/or Using the custom audience data as the primary selection criteria.

In one embodiment, algorithms are used to process the raw data format of third party audience data allowing flexibility in accepting different sources:

Each custom audience category may be sent either as an actual audience value or as a percentage;

Third party sources may send values as decimals, and need not round, in which case the DSP (404) and/or exchange (410) may round the full-precision values;

Each audience category may define multiple cohorts, where each cohort is a group within the category. For example, a category may be education level, while the cohorts are not-educated, high-school degree, and college degree;

Third-party sources may break down their data into unique geographic areas (e.g. DMA, MSA, or station) and time periods (weeks or non-standard dayparts). The algorithm then organizes the data to make it compatible with the breakdown granularities that the industry is used to with traditional data; and/or Each custom audience databook or "book" may have a defined active time period. These time periods may or may not influence the integration or use of the data. In one embodiment, it may be up to the person planning to choose the desired version of any given custom audience category.

FIG. 5 is an illustration of an embodiment of third party source audience data granularity. In one embodiment, the data format may permit breakdown values by DMA, daypart, and demo. The data need not initially incorporate this granularity. Breakout values may be an arbitrary number, for example the same as the rolled up value.

Using a Political category as an example, a station for the Republican cohort may have a 52,000 AQH (Average Quarter-Hour persons) value for the entire week. The AQH may be defined as the number of persons listening for at least fifteen minutes at any one point in time. A weekly AQH value is the average number of point-in-time listeners over the whole week. Note that the weekly AQH value may be much less than the total number of distinct listeners over the course of the week. Within a week, the third-party source may provide specific values for each daypart; or, if they do not have specific values, they may set the same value for each daypart, as showing in the Daypart column of FIG. 5 (502).

In the event the third-party data source has two levels of granularity, for example a 52,000 AQH for the station/cohort and then a granularity by daypart for M-F 6 a-10 a 95,000 AQH, M-F 10-3p 74,000 AQH, as shown in FIG. 5 (504), then other demographic and DMA may be set to a given AQH value for a specified daypart, in the example shown 95,000 AQH for any demographic and/or DMA for the M-F 6 a-10 a daypart.

In the event the third-party data source has four levels of granularity as shown in FIG. 5 (506), then each station/cohort, daypart, demographic and DMA may have its own AQH value for one or more permutations.

In one embodiment, for each custom audience category, the number of cohorts and breakdowns may be pre-defined and constant because these may define the number of columns per row, for example the audience data may be expressed in a file as follows:

| Column Name | Example |
|---|---|
| Station ID | 927 |
| Cohort (Target) | "Republican" |
| Daypart | M-F 6a-10a |
| Demo | Adults 18+ |
| DMA | Primary |
| AQH Impressions | 52,000 | wherein for possible values:

| Daypart Values | Demographic Values | DMA Values |
|---|---|---|
| 1 M-F 6a-10a | 1 Adults 18+ | 1 Primary |
| 2 M-F 10a-3p | 2 Adults 18-34 | 2 Secondary |
| 3 M-F 3p-7p | 3 Adults 25-54 | 3 Tertiary |
| 4 M-F 7p-12a | 4 Female 18+ | |
| 5 S+S 6a-10a | 5 Female 18-34 | |
| 6 S+S 10a-3p | 6 Female 25-54 | |
| 7 S+S 3p-7p | 7 Male 18+ | |
| 8 S+S 7p-12a | 8 Male 18-34 | |
| | 9 Male 25-54 | |

Architecture for Integration of Third Party Sources.

In one embodiment, the third party audience data may load automatically with automatic validations and notifications to reduce human interaction. Data format used may be CSV (comma separated values), JSON, and/or API based delivery.

The filename may follow a convention associated with the contents of the file, for example "US_political_index_201509_v1.csv" may indicate that the file contains information about the US Political Index for September 2015. The "_v1" indicates the version number of the file, in case there is a need to upload revisions. The latest version or 'v' number may be preferred. The file may represent a single custom audience category and version. The files may be expected on a frequent basis, for example monthly. Each file may define a single category, also known as an "audience insight" for a single version. For example— FIRST EG political index V1 and FIRST EG political index V2 are separate books.

File transfer may occur through cloud based services such as Amazon S3 onto a shared space. The DSP (404) and/or exchange (410) may periodically scan this location, for example daily, for new files to load. Based on the file convention and stored meta-data, the DSP (404) and/or exchange (410) may determine what data set is represented and load accordingly. With additional meta-data configured, the DSP (404) and/or exchange (410) may also determine how to interpret the data and make it available to the system. Meta-data may also determine when/how the new set may be used.

Before the dataset is fully loaded into the system, the DSP (404) and/or exchange (410) may validate the entire file and send notifications of any potential errors via Email or other communications. Errors may be classified between critical and non-critical. Critical errors may halt the loading of the data whereas non-critical may allow it to continue but with warnings.

Use Cases.

Two illustrative examples to show how integrated third-party audience data sources may be used are as follows:

Use Case #1. Traditional Radio Buyer Who Uses Nielsen Demo Traditional Audience Data, but Additionally Wants to Optimize Using FIRST EG Political Data.

In this example, a client is a radio agency (202/204) that is buying on behalf of a conservative Super PAC who want to reach an audience that is "moderate" to "liberal", and want a plan that excludes or indexes away from "very conservative" and "conservative" listeners. FIRST EG has a custom audience insight or Category that describes how each FIRST EG station indexes against 5 different audience cohorts—Very Conservative, Conservative, Moderate, Liberal, Very Liberal.

FIRST EG has already ingested this Category as a book that is active in the Planning system. FIRST EG Planner creates a proposal and first chooses to plan against a traditional Nielsen demographic, choosing "adults 18-54". Subsequently, the FIRST EG Planner chooses to add a set of cohorts from the FIRST EG Political audiences to maximize.

In this example, Nielsen Demo is the primary fitness factor and FIRST EG Political category and Liberal cohort is a one of several secondary factors. The planner (202/204) adds the remaining plan requirements and hits the "submit" button on the DSP (404) to run the algorithm to create a plan. A plan is generated and the planner may see a summary breakdown of how the plan performs against the FIRST EG Political category and Liberal cohort. In this case, the plan result could only hit 45% Liberal cohort because it had to balance this goal against other factors. The planner (202/204) adjusts the plan inputs and re-plans a few times until the desired plan is generated and then formally proposes the plan to the client. The planner exports the lineup and proposal summary document and emails to the agency buyer.

In one embodiment, the algorithm to process this scenario is based on the business sentiment that the planner wants to target persons who match both the Nielsen Demo and the Liberal cohort. A multi-demo-match algorithm gives high fitness only to targets that have a high demo-match in both measures:

Fitness=nielsenDemoMatch*liberalCohortMatch=
(nielsenDemoAqh/nielsenFullDemoAqh)*(liberalCohortAqh/politicalCategoryAqh)

In one embodiment, the political-category AQH is the sum of each of the cohorts within the category. As the two datasets are not necessarily coordinated with each other, no hard claims may be made about the number of listeners who fit the demo and the cohort. However, under the assumption that the datasets are uncorrelated, the impressions may be calculated simply as nielsenDemoAqh*liberalCohortMatch. These core algorithmic/calculation adjustments then suffice to allow the remainder of the planning process to function correctly when dealing with multiple simultaneous demographics.

Use Case #2. Digital Buyer Who Wants to Solely Use FIRST EG Political Data to Plan and Bill.

In this example, the client (202/204) is a digital agency looking to reach "Conservatives" on radio, for example they want to reach an audience that is conservative, or away from liberal cohorts. They may want to do both as well, targeting one cohort(s) while avoiding, as much as possible, some other cohort(s). FIRST EG has a custom audience insight or Category that describes how each FIRST EG station indexes against 5 different audience cohorts—Very Conservative, Conservative, Moderate, Liberal, Very Liberal.

FIRST EG has already ingested this Category as a book that is active in the Planning system. The buyer may use SpotPlan to choose the FIRST EG Political category as the primary selection criteria for the plan. The buyer chooses the Conservative cohort and assigns a 1M-impression goal to this cohort.

In this example, the FIRST EG Political category and Liberal cohort is the primary selection factor, and there is no use of the traditional Nielsen "first party" audience data. The buyer (202/204) adds the remaining plan requirements and hits the "submit" button on the DSP (404) to run the algorithm to create a plan. A plan is generated and the buyer (202/204) may see a summary breakdown of how the plan performs against the FIRST EG Political category and Conservative cohort. In this case, the plan result could only hit 750K Conservative impressions. The buyer (202/204) adjusts the plan inputs and re-plans a few times until a plan is generated that hits the 1M-impression goal for Conservatives. The buyer (202/204) books the plan and proceeds to the campaign management flow to create a campaign for this plan.

In one embodiment, to support targeting of just a cohort, the demo-match algorithm is adjusted to measure cohort match: cohortAqh/categoryAqh. To support the more challenging case of targeting some cohorts while avoiding others, a discriminative-demo-match algorithm is used:

demoMatch=(desiredCohortsAqh−avoidedCohortsAqh)/categoryAqh.

This core change to target fitness then may be incorporated normally into the rest of the planning process. By default, the number of impressions the plan accomplishes is the desired-cohorts' AQH. However, the impressions can also be calculated, if desired, as the desired minus the avoided AQHs.

Figure 6:
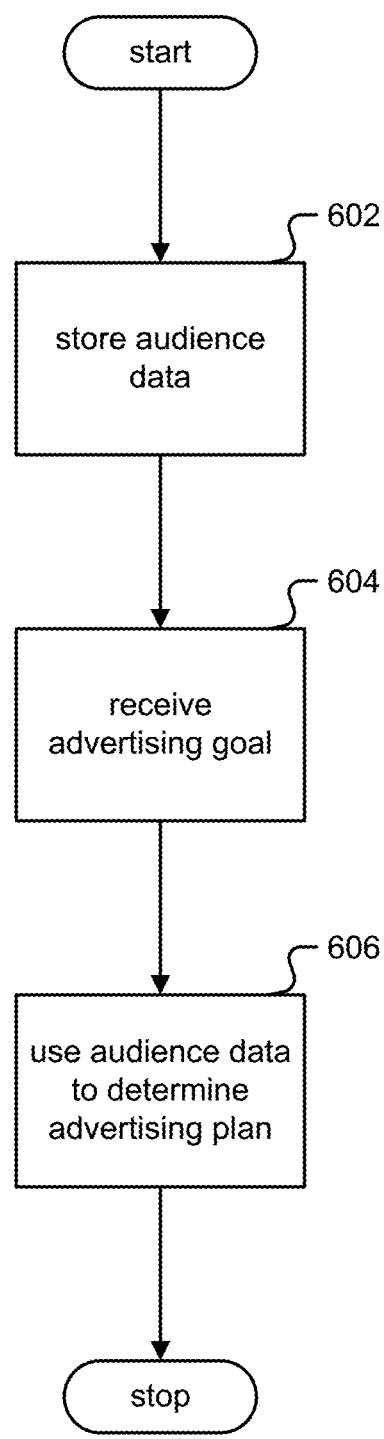
FIG. 6 is an illustration of a flow chart illustrating an embodiment of a process for using audience data in audio advertising.

FIG. 6 is an illustration of a flow chart illustrating an embodiment of a process for using audience data in audio advertising. In one embodiment, the process of FIG. 6 is carried out by the DSP (404) and/or exchange (410) including data targeting (414) of FIG. 4.

In step 602, audience data is stored in a data storage device, for example in a database (420) on exchange (410). In one embodiment, the audience data is received from a plurality of audience data sources. In one embodiment, an audience data source may be periodic, such as the Nielsen SDS. In one embodiment, an audience data source may be near real-time or continuous, such as a third-party data source. Third-party data sources may include affinities and/or cohorts, such as political cohorts or purchasing habits cohorts.

In step 604, an advertising goal defined at least in part by reference to one or more audience attributes is received. In one embodiment, this advertising goal is crafted using a DSP (404) by a buyer (202/204). The DSP (404) may present audience data from a plurality of audience data sources in an intuitive and/or non-confusing manner by filtering and/or abstracting audience attributes.

In step 606, audience data from the two or more of said audience data sources is used to determine an advertising plan to meet the advertising goal. In one embodiment, the two or more of said audience data sources comprises a first audience data source and a second audience data source; and the first audience data source comprises a first attribute data associated with a first audience attribute while the second audience data source does not include the first attribute data.

In one embodiment, the first attribute data comprises a goal, wherein the goal specifies a value or a range for the first audience attribute. In one embodiment, the second audience data source comprises a second attribute data associated with the second audience attribute. In one embodiment, the first attribute data comprises a goal, wherein the goal specifies a value for both the first audience attribute and the second audience attribute.

In one embodiment, the first audience attribute is a broad demographic and the second audience attribute is an affinity. In one embodiment, the first audience attribute is a broad demographic and the second audience attribute is a set of cohorts. In one embodiment, the political cohort includes a target for a first cohort while avoiding a second cohort. In one embodiment, the first audience data source is a broad demographic source and the second audience data source is a third-party source.

In one embodiment, the second audience data source is abstracted to measure a similar geographical region as the first audience data source, for example an MSA or DMA. In one embodiment, the second audience data source is abstracted to measure a similar time period as the first audience data source.

In one embodiment, using audience data comprises using a multi-demo-match algorithm for targets with a high match in two measures. In one embodiment, the multi-demo-match algorithm comprises a product of the first attribute data with the second attribute data. In one embodiment, using audience data comprises using a discriminative-demo-match algorithm for target at least one cohort while avoiding at least another cohort. In one embodiment, the discriminative-demo-match algorithm comprises a quotient involving a cohort match.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a data storage device configured to store audience data received from a plurality of audience data sources, wherein one of the plurality of audience data sources is a traditional audience data source and another of the plurality of audience data sources is a third-party audience data source;
a network interface coupled to a sidecar appliance within a linear radio broadcast station, wherein the sidecar appliance is configured to submit audio spots directly for listening at the linear radio broadcast station;
a processor coupled to the data storage device and the network interface, and configured to:
receive an advertising goal defined at least in part by reference to one or more audience attributes;
abstract the third-party audience data source to daypart time periods and geographic regions associated with the traditional audience data source based on Average Quarter-Hour persons (AQHs) of dayparts, comprising to:
weigh an AQH of a first daypart by a number of hours of the first daypart divided by a number of hours in a corresponding user daypart to obtain a first weighted AQH;
weigh an AQH of a second daypart by a number of hours of the second daypart divided by a number of hours in the corresponding user daypart to obtain a second weighted AQH; and
sum the first weighted AQH and the second weighted AQH to obtain the AQHs of the dayparts; and
use audience data from two or more of said audience data sources to determine an advertising plan to meet the advertising goal, wherein the advertising plan comprises one or more audio spots for the sidecar appliance.

2. The system recited in claim 1, wherein:
the two or more of said audience data sources comprises a first audience data source and a second audience data source; and
the first audience data source comprises a first attribute data associated with a first audience attribute while the second audience data source does not include the first attribute data.

3. The system recited in claim 2, wherein the first attribute data comprises a goal, wherein the goal specifies a value or a range for the first audience attribute.

4. The system recited in claim 2, wherein the second audience data source comprises a second attribute data associated with the second audience attribute.

5. The system recited in claim 4, wherein the first attribute data comprises a goal, wherein the goal specifies a value for both the first audience attribute and the second audience attribute.

6. The system recited in claim 5, wherein the first audience attribute is a broad demographic and the second audience attribute is an affinity.

7. The system recited in claim 5, wherein the first audience attribute is a broad demographic and the second audience attribute is a set of cohorts.

8. The system recited in claim 7, wherein a political cohort within the set of cohorts includes a target for a first cohort while avoiding a second cohort.

9. The system recited in claim 2, wherein the first audience data source is a broad demographic source and the second audience data source is a third-party source.

10. The system recited in claim 9, wherein the processor is further configured to abstract the second audience data source to measure a similar geographical region as the first audience data source.

11. The system recited in claim 10, wherein the similar geographical region is an MSA (Metropolitan Statistical Area) or DMA (Designated Market Area).

12. The system recited in claim 9, wherein the processor is further configured to abstract the second audience data source to measure a similar time period as the first audience data source.

13. The system recited in claim 9, wherein using audience data comprises using a multi-demo-match algorithm for targets with a high match in two measures.

14. The system as recited in claim 13, wherein the multi-demo-match algorithm comprises a product of the first attribute data with the second attribute data.

15. The system recited in claim 9, wherein using audience data comprises using a discriminative-demo-match algorithm for target at least one cohort while avoiding at least another cohort.

16. The system recited in claim 15, wherein the discriminative-demo-match algorithm comprises a quotient involving a cohort match.

17. A method, comprising:
storing audience data received from a plurality of audience data sources, wherein one of the plurality of audience data sources is a traditional audience data source and another of the plurality of audience data sources is a third-party audience data source;
receiving an advertising goal defined at least in part by reference to one or more audience attributes;

abstracting the third-party audience data source to daypart time periods and geographic regions associated with the traditional audience data source based on Average Quarter-Hour persons (AQHs) of dayparts, comprising:
- weighing an AQH of a first daypart by a number of hours of the first daypart divided by a number of hours in a corresponding user daypart to obtain a first weighted AQH;
- weighing an AQH of a second daypart by a number of hours of the second daypart divided by a number of hours in the corresponding user daypart to obtain a second weighted AQH; and
- summing the first weighted AQH and the second weighted AQH to obtain the AQHs of the dayparts; and using audience data from two or more of said audience data sources to determine an advertising plan to meet the advertising goal, wherein the advertising plan comprises one or more audio spots for a sidecar appliance, and wherein the sidecar appliance is within a linear radio broadcast station and configured to submit audio spots directly for listening at the linear radio broadcast station.

18. The method recited in claim 17, wherein the two or more of said audience data sources comprises a first audience data source and a second audience data source; and the first audience data source comprises a first attribute data associated with a first audience attribute while the second audience data source does not include the first attribute data.

19. A computer program product, the computer program product being embodied in a non-transitory computer readable storage medium and comprising computer instructions for:

storing audience data received from a plurality of audience data sources, wherein one of the plurality of audience data sources is a traditional audience data source and another of the plurality of audience data sources is a third-party audience data source;

receiving an advertising goal defined at least in part by reference to one or more audience attributes;

abstracting the third-party audience data source to daypart time periods and geographic regions associated with the traditional audience data source based on Average Quarter-Hour persons (AQHs) of dayparts, comprising:
- weighing an AQH of a first daypart by a number of hours of the first daypart divided by a number of hours in a corresponding user daypart to obtain a first weighted AQH;
- weighing an AQH of a second daypart by a number of hours of the second daypart divided by a number of hours in the corresponding user daypart to obtain a second weighted AQH; and
- summing the first weighted AQH and the second weighted AQH to obtain the AQHs of the dayparts; and using audience data from two or more of said audience data sources to determine an advertising plan to meet the advertising goal, wherein the advertising plan comprises one or more audio spots for a sidecar appliance, and wherein the sidecar appliance is within a linear radio broadcast station and configured to submit audio spots directly for listening at the linear radio broadcast station.

20. The computer program product recited in claim 19, wherein the two or more of said audience data sources comprises a first audience data source and a second audience data source; and the first audience data source comprises a first attribute data associated with a first audience attribute while the second audience data source does not include the first attribute data.

\* \* \* \* \*